(12) United States Patent
Suzui et al.

(10) Patent No.: US 6,801,442 B2
(45) Date of Patent: Oct. 5, 2004

(54) POWER CONVERSION APPARATUS, POWER CONVERSION SYSTEM, AND ISLANDING OPERATION DETECTION METHOD

(75) Inventors: Masaki Suzui, Kyoto (JP); Nobuyoshi Takehara, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/443,959

(22) Filed: May 23, 2003

(65) Prior Publication Data

US 2003/0218888 A1 Nov. 27, 2003

Related U.S. Application Data

(63) Continuation of application No. PCT/JP02/10062, filed on Sep. 27, 2002.

(30) Foreign Application Priority Data

Oct. 1, 2001 (JP) ........................................ 2001-305694
Sep. 17, 2002 (JP) ........................................ 2002-270555

(51) Int. Cl.[7] .......................... H02H 7/122; H02M 7/60
(52) U.S. Cl. ........................... 363/55; 363/97; 363/109; 363/132; 363/71; 307/30
(58) Field of Search ................................. 363/55, 56.01, 363/56.09, 95, 97, 109, 131, 135, 71, 72; 361/60, 62; 307/30, 45

(56) References Cited

U.S. PATENT DOCUMENTS

| | | | |
|---|---|---|---|
| 5,548,504 A | 8/1996 | Takehara | 363/65 |
| 5,592,074 A | 1/1997 | Takehara | 363/131 |
| 5,621,300 A | 4/1997 | Sato et al. | 320/5 |
| 5,669,987 A | 9/1997 | Takehara et al. | 136/244 |
| 5,714,869 A | 2/1998 | Tamechika et al. | 320/30 |
| 5,751,133 A | 5/1998 | Sato et al. | 320/13 |
| 5,869,956 A | 2/1999 | Nagao et al. | 323/299 |
| 5,892,354 A | 4/1999 | Nagao et al. | 323/299 |
| 5,923,158 A | 7/1999 | Kurokami et al. | 323/299 |
| 5,955,885 A | 9/1999 | Kurokami et al. | 324/426 |
| 5,986,354 A | 11/1999 | Nagao et al. | 307/64 |
| 6,101,073 A | 8/2000 | Takehara | 361/42 |
| 6,219,623 B1 * | 4/2001 | Wills | 363/109 X |

(List continued on next page.)

FOREIGN PATENT DOCUMENTS

| | | |
|---|---|---|
| JP | 7245876 | 9/1995 |
| JP | 8070534 | 3/1996 |
| JP | 9084251 | 3/1997 |
| JP | 9098539 | 4/1997 |
| JP | 10336903 | 12/1998 |
| JP | 3028205 | 4/2000 |
| JP | 2000152506 | 5/2000 |
| JP | 2001169565 | 6/2001 |
| WO | WO 99/27629 | 6/1999 |

OTHER PUBLICATIONS

Kitamura et al., "Islanding Prevention Technique by the Active/Passive Series Method," Paper No. 32, Power & Energy Society of the Institute of Electrical Engineers of Japan (2000), (no month).

Primary Examiner—Jessica Han
(74) Attorney, Agent, or Firm—Fitzpatrick, Cella, Harper & Scinto

(57) ABSTRACT

When islanding operation is to be detected in a power conversion apparatus for converting a DC power into an AC power and outputting the AC power to a system power supply, a plurality of variation generation systems for executing, in accordance with different schemes, detection of islanding operation in which power supply from the system power supply is stopped are arranged, and at least one variation generation systems is selected by selection system from the plurality of variation generation systems and operated.

28 Claims, 12 Drawing Sheets

U.S. PATENT DOCUMENTS

| | | | |
|---|---|---|---|
| 6,278,052 B1 | 8/2001 | Takehara et al. | 136/244 |
| 6,320,769 B2 | 11/2001 | Kurokami et al. | 363/56.03 |
| 6,493,246 B2 | 12/2002 | Suzui et al. | 363/95 |
| 6,590,793 B1 | 7/2003 | Nagao et al. | 262/95 |
| 2001/0048605 A1 | 12/2001 | Kurokami et al. | 363/56.03 |
| 2002/0044473 A1 | 4/2002 | Toyomura et al. | 363/142 |
| 2002/0006728 A1 | 6/2002 | Takehara et al. | 363/95 |
| 2002/0105765 A1 | 8/2002 | Kondo et al. | 361/42 |
| 2002/0118559 A1 | 8/2002 | Kurokami et al. | 363/131 |
| 2002/0135496 A1 | 9/2002 | Takehara | 340/870.17 |
| 2003/0067723 A1 | 4/2003 | Suzui et al. | 361/42 |

* cited by examiner

POWER CONVERSION APPARATUS, POWER CONVERSION SYSTEM, AND ISLANDING OPERATION DETECTION METHOD

This application is a continuation of International Application No. PCT/JP02/10062, filed Sep. 27, 2002, which in turn claims priority of Japanese Application Nos. 2001-305694, filed Oct. 1, 2001, and 2002-270555, filed Sep. 17, 2002, the priorities of which are hereby claimed, said International Application having been published in English as WO 03/032475 A2 on Apr. 17, 2003.

TECHNICAL FIELD

The present invention relates to a power conversion apparatus, power conversion system, and islanding operation detection method and, more particularly, to a power conversion apparatus which converts a DC power into to an AC power and outputs the AC power to a system power supply, a power conversion system which has a plurality of power conversion apparatuses, and an islanding operation detection method in the apparatus or system.

BACKGROUND ART

In recent years, since problems of global warming due to carbon dioxide emission by use of fossil fuel and radioactive contamination by nuclear power plant accidents and radioactive waste have become serious, interests in global environment and energy are growing. Under these circumstances, solar power generation that uses solar light as an inexhaustible and clean energy source, geothermal power generation using the geothermal energy, wind power generation using the wind power, and the like have been put into practice all over the world.

A DC power generated by such a natural energy is converted into an AC power by a power conversion apparatus called an inverter and supplied to, e.g., a commercial power system.

FIG. 5 is a block diagram showing a general arrangement of a solar power generation system. Referring to FIG. 5, reference numeral 1 denotes a solar battery; 10, a system interconnection inverter apparatus (to also be simply referred to as an inverter hereinafter); 3, a circuit breaker; 4, an AC system; and 5, a load.

The inverter 10 is mainly constituted by a power conversion means 21, removal means 22, control means 25, and active scheme implementation means 103. The power conversion means 21 is formed from a known converter circuit and inverter circuit to convert a DC power output from the solar battery 1 into an AC power and output the AC power to the system 4. The removal means 22 removes the inverter 10 from the system 4 in accordance with a removal signal output from the control means 25. The control means 25 controls the entire inverter 10.

The active scheme implementation means 103 has a means 231 (to also be simply referred to as an implementation means or a variation generation means hereinafter) for detecting that power supply from the system is stopped, and islanding operation starts in accordance with an active scheme that gives a small variation to the output current, frequency, phase, or the like. The inverter 10 implements an active power variation scheme by the implementation means 231.

As active schemes, an active power variation scheme which outputs a power instruction value (to be referred to as a fluctuation instruction value hereinafter) that superposes a fluctuation component having a predetermined period on an output current so as to generate, in the output current from the inverter 10, a variation having the predetermined period with respect to the output voltage, a reactive power variation scheme which outputs a signal (to be referred to as a phase shift signal hereinafter) obtained by adding a phase difference $\Delta\phi$ to a phase signal at a predetermined period so as to generate the predetermined phase difference $\Delta\phi$ in the output current from the inverter 10 every predetermined period, and a reactive power variation scheme which outputs a phase shift signal for setting a phase advance or delay in accordance with the frequency of a detected output so as to change the output frequency of the inverter 10 are known. These schemes are described in, e.g., Japanese Patent Laid-Open Nos. 8-70534, 9-98539, and 7-245876, respectively.

FIG. 12 is a block diagram showing another arrangement of the solar power generation system. Referring to FIG. 12, reference numeral 1 denotes a solar battery; 8, a system interconnection inverter; 3, a circuit breaker; 4, an AC system; and 5, a load. The same reference numerals as in the solar power generation system shown in FIG. 5 denote the same parts in FIG. 12.

The inverter 8 is mainly constituted by a power conversion means 21, removal means 22, control means 26, and passive scheme implementation means 83. The power conversion means 21 is formed from a known converter circuit and inverter circuit to convert a DC power output from the solar battery 1 into an AC power and output the AC power to the system 4. The removal means 22 removes the inverter 8 from the system 4 upon receiving a removal signal output from the control means 26. The control means 26 controls the entire inverter 8.

The passive scheme implementation means 83 has a means 331 (to be referred to as a power failure detection means 331 hereinafter) for implementing, of islanding operation detection schemes, a voltage phase jump detection scheme as a passive scheme which detects islanding operation by detecting a power failure. The inverter 8 implements the voltage phase jump detection scheme by the power failure detection means 331.

As passive schemes, a voltage phase jump detection scheme which detects a jump in instantaneous phase of an output voltage, thereby determining a power failure in the system, a third harmonic voltage distortion abrupt increase detection scheme which detects an abrupt increase in third harmonic distortion of the output voltage of the inverter, which occurs at the time of a power failure, thereby determining a power failure in the system, and a frequency change rate detection scheme which detects an abrupt change in frequency of the output voltage of the inverter, which occurs at the time of a power failure, thereby determining a power failure in the system are known. These schemes are described in, e.g., Japanese Patent Laid-Open Nos. 2001-169565, 9-84251, and 10-336903, respectively.

It is reported that in an inverter having a single passive or active scheme as described above, when parallel operation of a plurality of inverters of the same model (to be referred to as a multiple inverter parallel operation hereinafter) is executed under conditions that almost balance the output power of the inverter and load power consumption, islanding operation continuously takes place.

To prevent such continuous islanding operation, in executing multiple inverter parallel operation of system interconnection inverters, a master inverter 10' and remaining inverters 10 are connected by master-slave cables 12 to execute synchronous operation of the inverters, as shown in FIG. 6, in order to eliminate mutual interference of the active scheme for detecting islanding operation, as disclosed in, e.g., Japanese Patent Laid-Open No. 2000-152506 or Japanese Patent No. 3028205.

However, to execute multiple inverter parallel operation based on master-slave connection as described above, master-slave connection cables are necessary. This increases the cost, complicates install operation, and decreases the degree of freedom in installation.

On the other hand, as is reported in Kitamura et al., Paper No. 32, Power & Energy Society of the Institute of Electrical Engineers of Japan (2000), when parallel operation is executed using a plurality of inverters of different types, the duration of islanding operation shortens unless mutual interference occurs because the inverters have different dead bands for the active scheme or passive scheme, and also, the generation conditions are limited, unlike parallel operation of a plurality of inverters of the same model.

However, to execute parallel operation of a plurality of inverters by directly referring to the above report, a plurality of inverters of different types must be prepared. This greatly increases the labor and cost.

In addition, for example, when parallel operation is to be executed by installing home solar power generation systems in neighboring houses, it is substantially impossible to grasp the islanding operation schemes of the inverters of the respective houses. Even inverters of different types are also hard to prepare. Especially, if a system interconnection system which requires no prior application to electric power companies becomes popular, and for example, if a system such as an AC module to be inserted into a wall socket greatly penetrates, it becomes more difficult to grasp the islanding operation detection schemes of the system interconnection systems in neighboring homes.

Alternatively, a plurality of implementation means of different schemes may be arranged in a single inverter and simultaneously operated to reduce the dead band. However, to simultaneously process the schemes of a plurality of types, a control section must have a more advanced processing capability. Since a CPU or microcomputer to be used becomes expensive, the cost of the inverter increases.

DISCLOSURE OF INVENTION

It is an object of the present invention to provide a power conversion apparatus that requires no labor to prepare a plurality of kinds of inverters and no master-slave cables even for parallel operation of a plurality of inverters, is inexpensive, and has a good operability and high degree of freedom in installation.

It is another object of the present invention to provide a power conversion system that requires no labor to prepare a plurality of kinds of inverters and no master-slave cables even for parallel operation of a plurality of inverters, is inexpensive, and has a good operability and high degree of freedom in installation.

It is still another object of the present invention to provide an islanding operation detection method which implements a power conversion apparatus that requires no labor to prepare a plurality of kinds of inverters and no master-slave cables even for parallel operation of a plurality of inverters, is inexpensive, and has a good operability and high degree of freedom in installation.

In order to achieve the above object, a power conversion apparatus of the present invention is a power conversion apparatus for converting a DC power into an AC power and outputting the AC power to a system power supply, characterized by comprising:

islanding operation detection means having a plurality of different schemes which detect an islanding operation state in which power supply from the system power supply is stopped; and selection means for selecting at least one scheme to be operated from the plurality of schemes.

In addition, a power conversion system of the present invention, which achieves another object, is a power conversion system comprising a plurality of sets of the above-described power conversion apparatuses and DC power supplies which are arranged in correspondence with the power conversion apparatuses and supply the DC power, characterized in that schemes in substantially equal number are selected in the system.

Furthermore, still another object is also achieved by an islanding operation detection method corresponding to the power conversion apparatus and power conversion system according to the present invention.

More specifically, in the present invention, when islanding operation is to be detected in a power conversion apparatus for converting a DC power into an AC power and outputting the AC power to a system power supply, islanding operation detection means having a plurality of different schemes which detect an islanding operation state in which power supply from the system power supply is stopped is arranged, and at least one scheme is selected from the plurality of implementation means and operated.

With the above arrangements, in executing multiple inverter parallel operation using a plurality of power conversion apparatuses, a well-balanced combination of islanding operation detection schemes to be operated in the respective power conversion apparatuses is selected. Since no master-slave cables are necessary, the entire cost decreases, the operability in installation increases, and the degree of freedom in installation increases. In addition, in multiple inverter parallel operation, no power conversion apparatuses for detecting islanding operation in accordance with different active schemes or passive schemes need be prepared. Furthermore, in mass production of power conversion apparatuses of the same model, a more inexpensive power conversion apparatus can be implemented.

The plurality of schemes may be either active schemes or passive schemes or may include active schemes and passive schemes.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will now be described in detail in accordance with the accompanying drawings.

Outline

The arrangement of a solar power generation system according to the present invention, which is common to the following embodiments, will be described first.
(First Mode)

Figure 1:
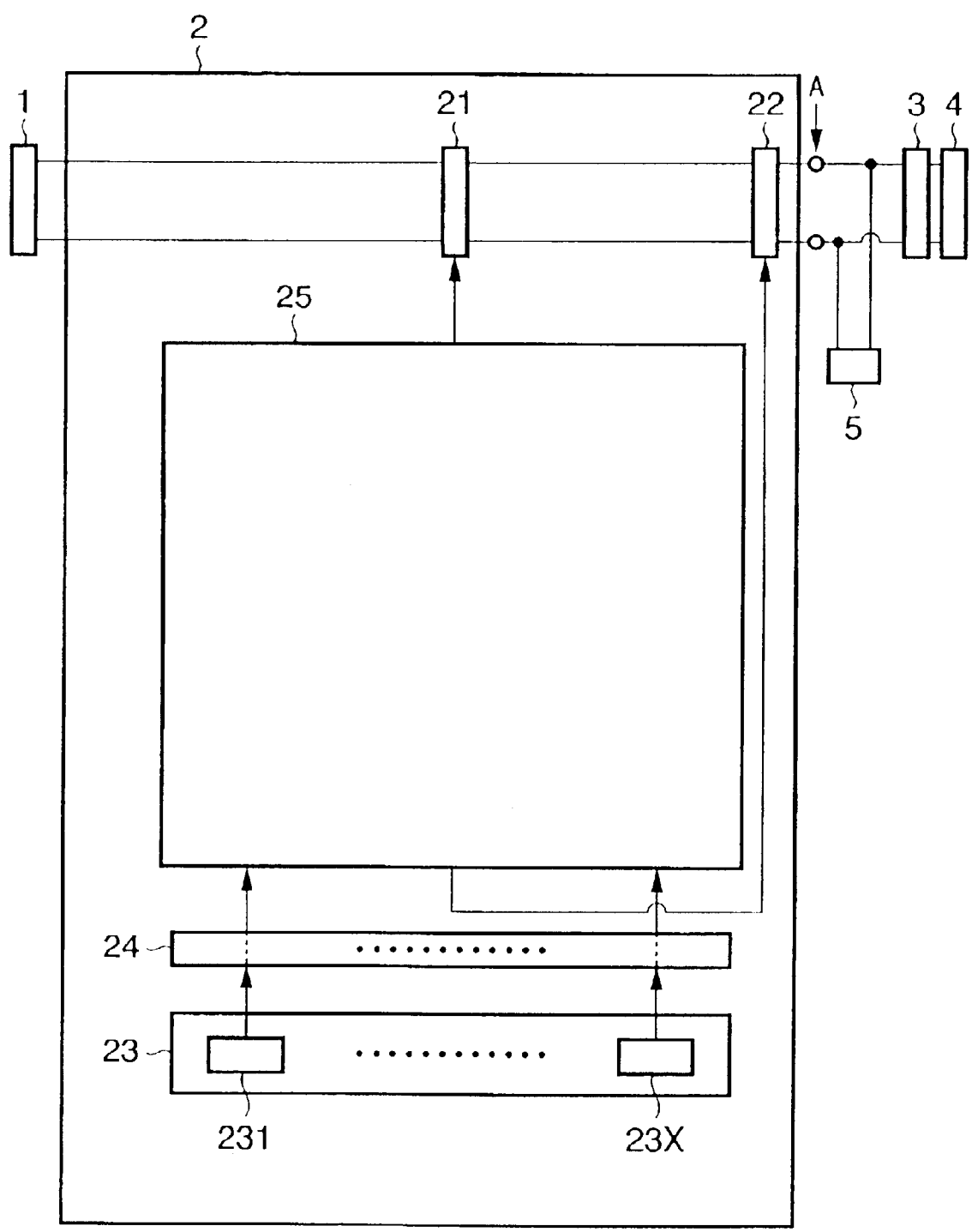
FIG. 1 is a block diagram showing an arrangement of a solar power generation system according to the present invention.

FIG. 1 is a block diagram showing an arrangement of a solar power generation system according to the present invention. A solar battery 1 shown in FIG. 1 is one of various solar battery modules using amorphous silicon, crystallite silicon, polysilicon, single-crystal silicon, a combination thereof, a compound semiconductor, and the like. Normally, a plurality of solar battery modules are combined in series and in parallel to form an array structure such that a desired voltage and current can be obtained. In the present invention, the type, arrangement, and number of solar battery modules are not limited to specific ones.

Figure 5:
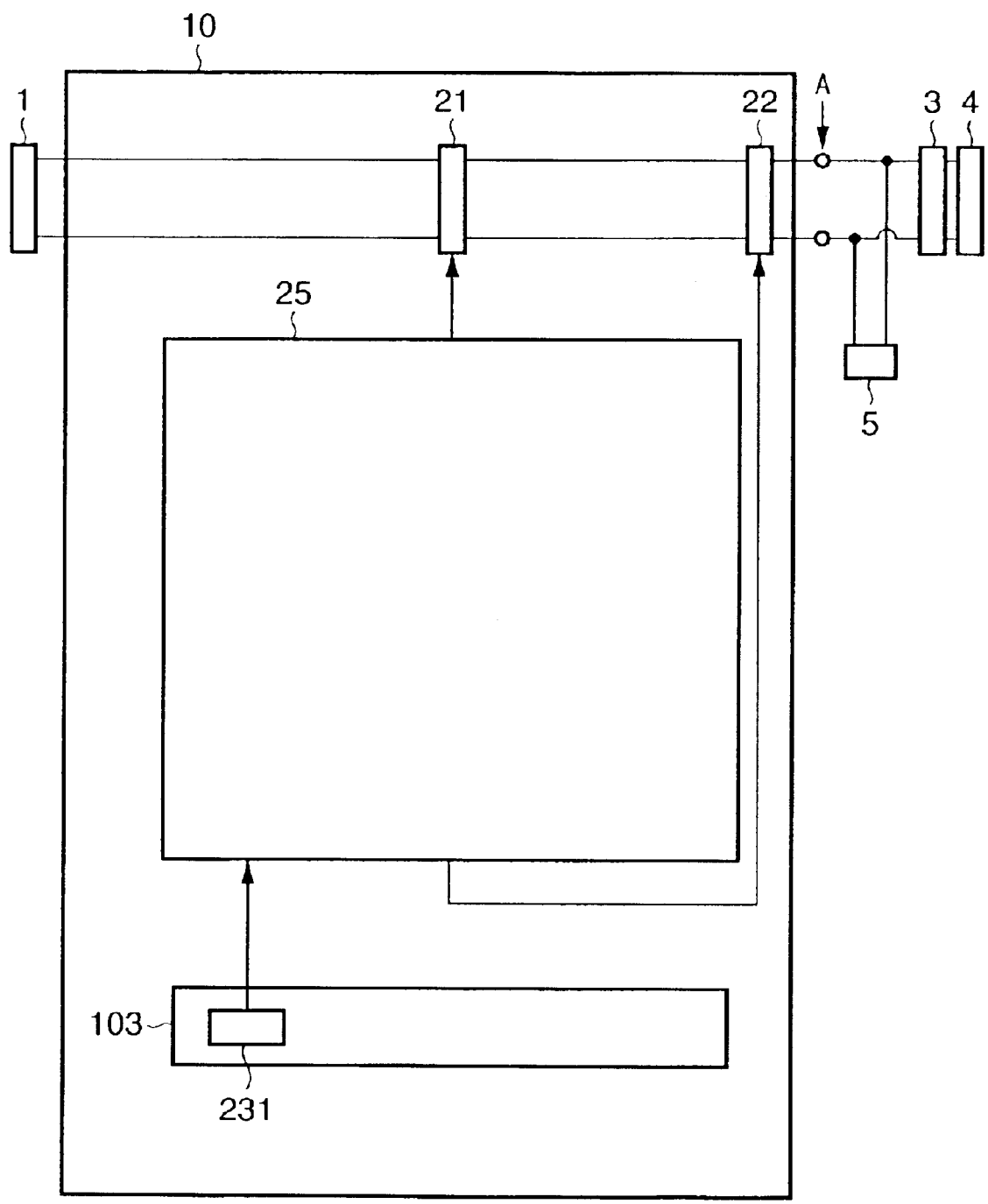
FIG. 5 is a block diagram showing an arrangement of a conventional solar power generation system.
Figure 6:
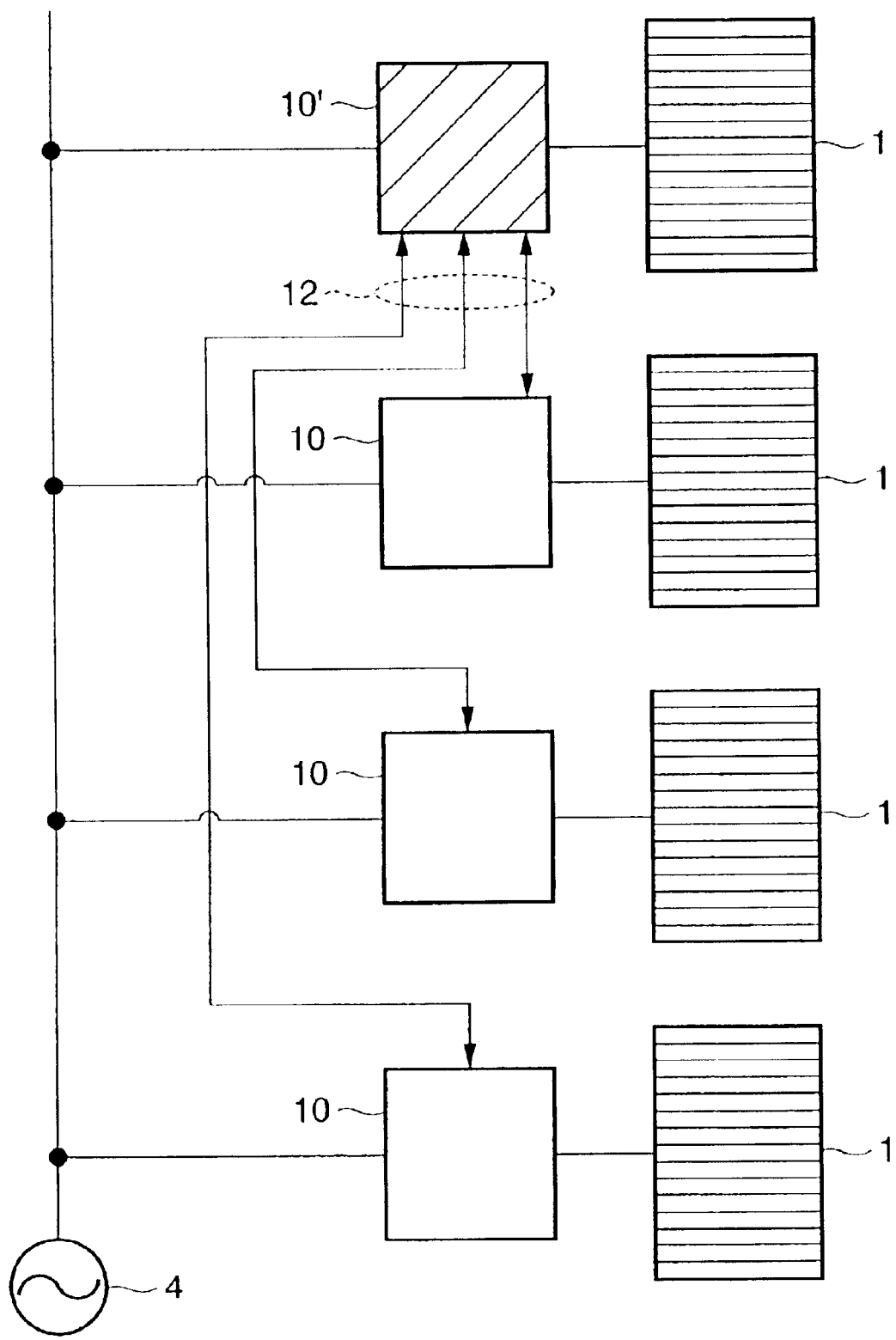
FIG. 6 is a view showing the multiple inverter parallel operation of conventional system interconnection inverters.

Referring to FIG. 1, a circuit breaker 3, AC system 4, and load 5 are the same as those of the prior art described with reference to FIG. 5, and a description thereof will be omitted here. The same reference numerals as in the prior art denote the same parts in the following description, and a description thereof will be omitted.

A system interconnection inverter apparatus (to also be simply referred to as an inverter hereinafter) 2 is mainly constituted by a power conversion means 21, removal means 22, active scheme implementation means 23, selection means 24, and control means 25. In parallel operation, the outputs from inverters are connected to each other at a connection point A.

The active scheme implementation means 23 is a means for implementing a general active scheme for islanding operation detection and has implementation means 231 to 23X which execute islanding operation detection in accordance with different active schemes. The selection means 24 is a means for selecting one or more means to be operated from the above implementation means. The selected implementation means is connected to the control means 25. The control means 25 is a control means for the entire inverter 2. The control means 25 outputs a driving signal to the power conversion means 21 and a removal signal to the removal means 22. The islanding operation detection scheme of the inverter 2 has a plurality of different active schemes. Independent operation is detected by detecting a disturbance in the system responding to a power failure, which is given by the plurality of active schemes, by various kinds of system protection functions (system abnormality detection function) or the like.

Functions that are generally prepared in a system interconnection inverter, i.e., boost control, output waveform control, activation/stop control, MPPT (Maximum Power Point Tracking) control, interconnection protection, inverter protection (a function for detecting a system voltage abnormality or a system frequency abnormality), and the like are irrelevant to the present invention, and a detailed description thereof will be omitted. A description of various kinds of detectors and sensors for implementing these functions will also be omitted due to the same reason as described above.

The inverter 2 of the present invention will be compared with the conventional inverter 10 described with reference to FIG. 5. The arrangement of the active scheme implementation means 23 is different from that of the active scheme implementation means 103. The inverter 2 has the selection means 24. The basic arrangement of the inverter 10 is the same as that of the inverter 2 except the above points. In addition, the number of implementation means in the active scheme implementation means 23 is different from that in the active scheme implementation means 103.

The present invention is not limited to the above arrangement. It is only necessary that one system interconnection inverter apparatus has an islanding operation detection means having a plurality of kinds of active schemes, one or more schemes can be selected from the plurality of schemes, and the selected scheme can be applied as an active scheme.

Figure 2:
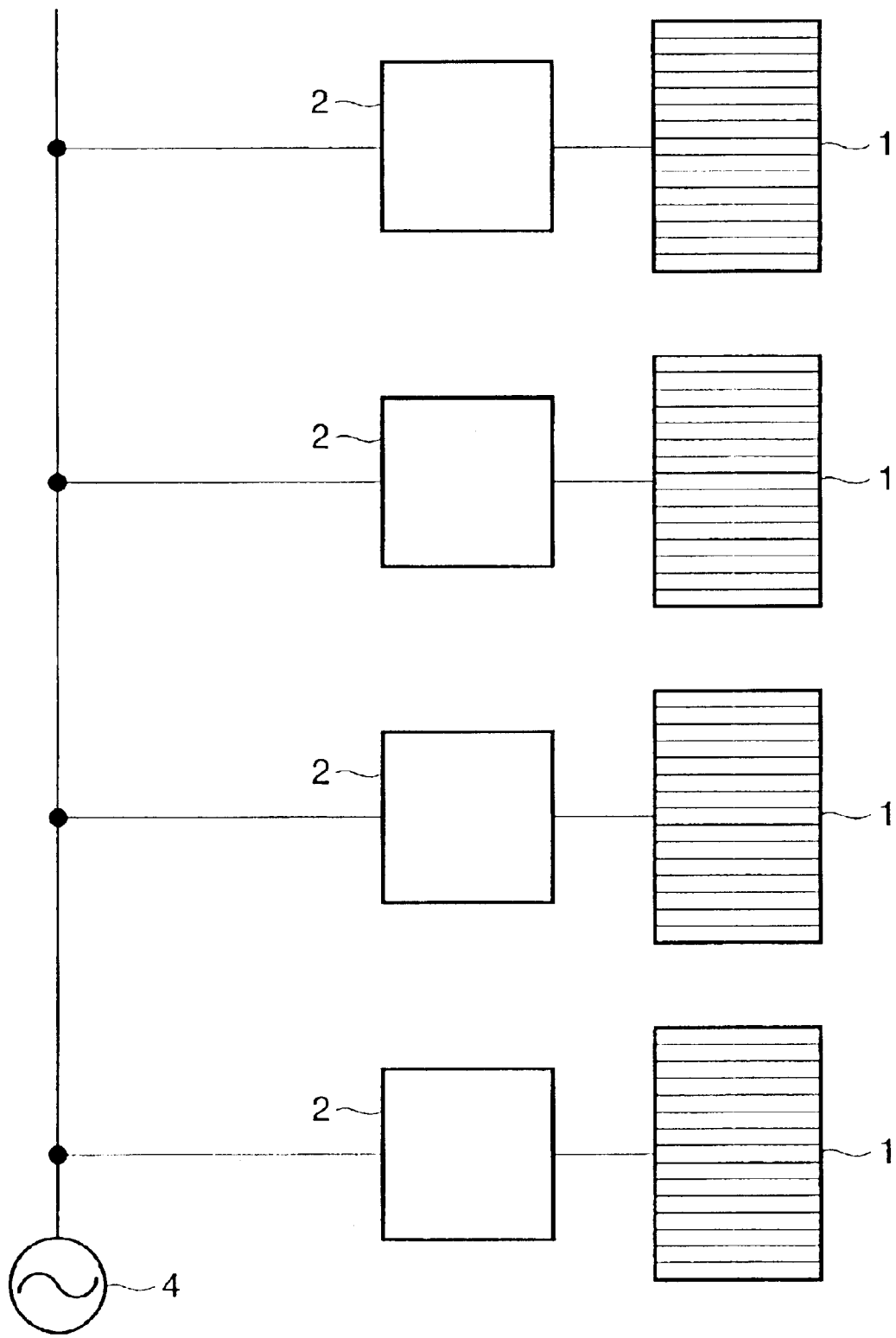
FIG. 2 is a view showing the multiple inverter parallel operation of system interconnection inverters according to the present invention.

As shown in FIG. 2, multiple inverter parallel operation of such system interconnection inverters 2 is executed. In this case, there is no master-slave distinction between the inverters 2. In addition, to mutually compensate for the dead zones of the respective active schemes and to prevent any unbalanced operation between the active schemes, the number of types of active schemes mounted is preferably larger.
(Second Mode)

Figure 7:
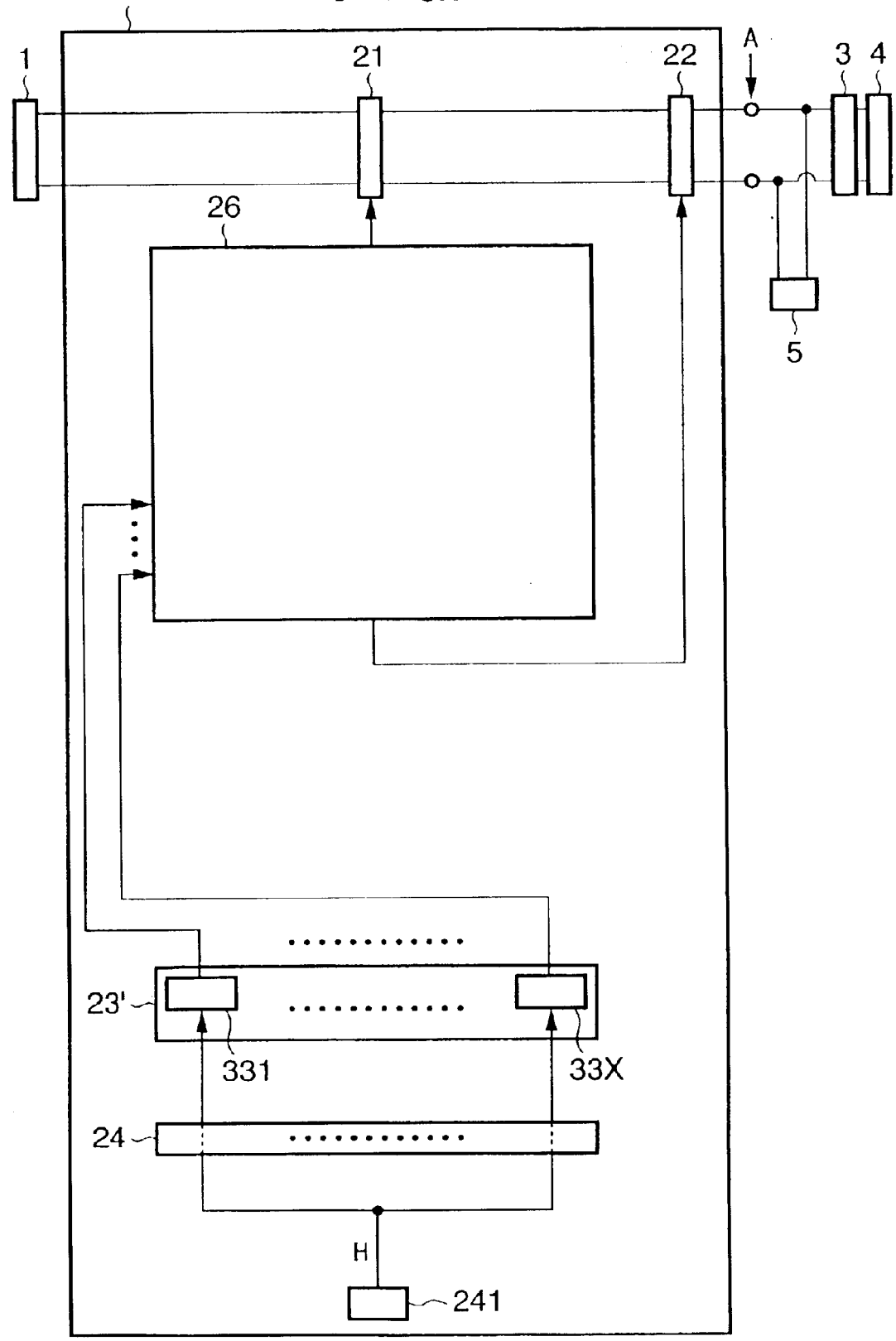
FIG. 7 is a block diagram showing another arrangement of the solar power generation system according to the present invention.

FIG. 7 is a block diagram showing another arrangement of the solar power generation system according to the present invention. The same reference numerals as in the above description denote the same parts in FIG. 7, and a description thereof will be omitted.

An inverter 101 shown in FIG. 7 is mainly constituted by a power conversion means 21, removal means 22, passive scheme implementation means 23', selection means 24, and control means 26.

The passive scheme implementation means 23' is a means for implementing a general passive scheme for islanding operation detection and has power failure detection means 331 to 33X which detect islanding operation (power failure) in accordance with different schemes. The selection means 24 is a means for selecting one of the above power failure detection means and outputs an interconnection signal 241 (to be described later) to the selected power failure detection means. The selected power failure detection means starts determining a power failure in the system in accordance with the received interconnection signal. Upon determining a power failure, the power failure detection means outputs a power failure signal representing the power failure to the control means 26. Note that the islanding operation detection means of the inverter 101 has a plurality of different passive schemes and detects islanding operation (power failure) using a scheme selected by the selection means 24.

The control means 26 is a control means for the inverter 101. The control means 26 outputs a driving signal to the power conversion means 21 and, upon receiving a stop signal, stops the power conversion operation of the inverter 101 and outputs a removal signal to the removal means 22. During system interconnection, the control means 26 outputs the interconnection signal 241 to the selection means 24.

Figure 12:
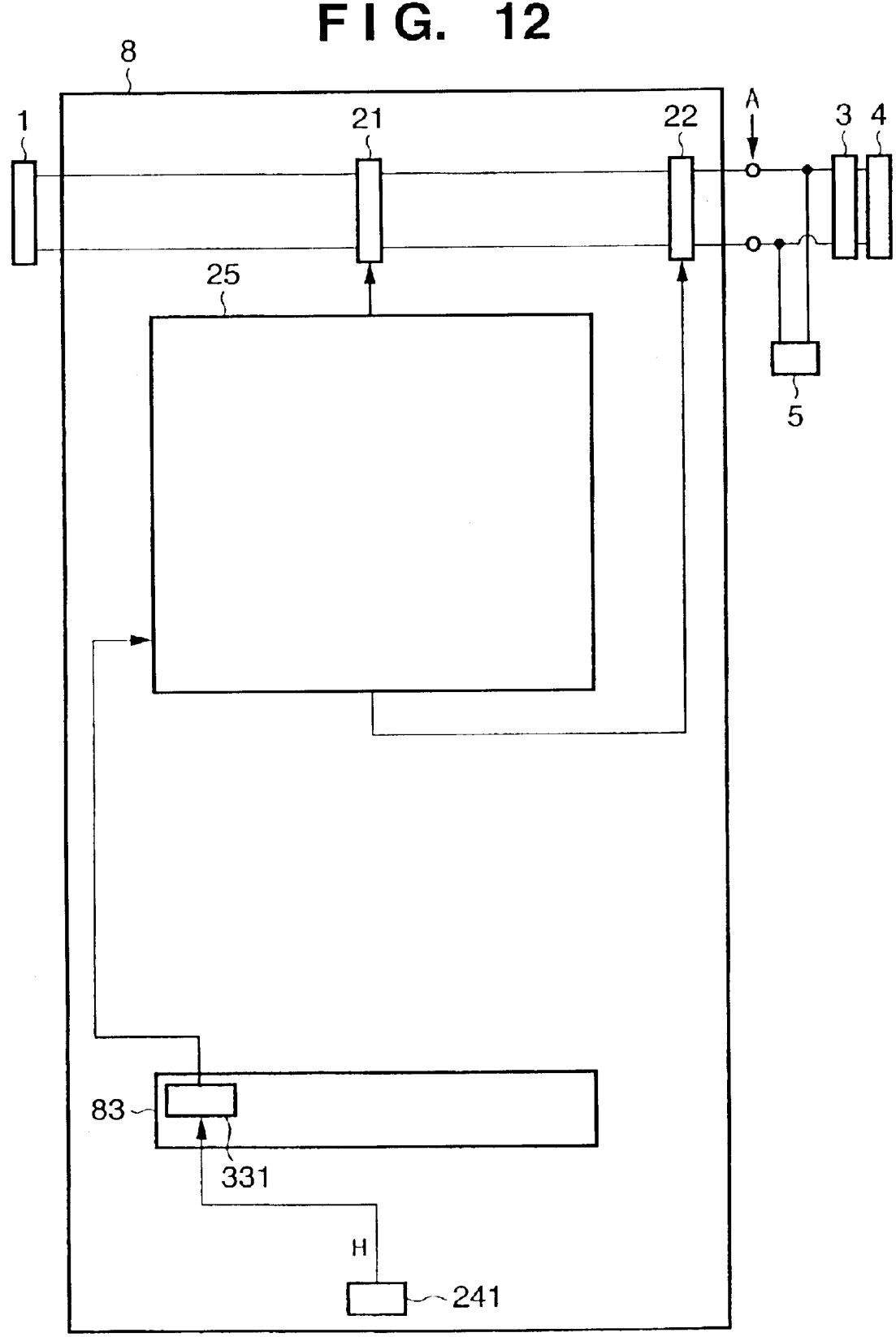
FIG. 12 is a block diagram showing another arrangement of the conventional solar power generation system.

The inverter 101 of the present invention will be compared with the conventional inverter 8 described with reference to FIG. 12. The arrangement of the passive scheme implementation means 23' is different from that of the passive scheme implementation means 83. The inverter 101 has the selection means 24. The basic arrangement of an inverter 101 is the same as that of the inverter 8 except the above points. The number of power failure detection means included in the passive scheme implementation means 23' is different from that in the passive scheme implementation means 83.

The present invention is not limited to the above arrangement. It is only necessary that one system interconnection inverter apparatus has a plurality of passive schemes of different schemes, one or more schemes can be selected from the plurality of schemes, and the selected scheme can be applied as a passive scheme.

In executing multiple inverter parallel operation, to mutually compensate for the dead zones of the respective passive schemes and to prevent any unbalanced operation between the passive schemes, the number of types of passive schemes mounted is preferably larger.

The passive scheme implementation means 23' shown in FIG. 7 is preferably implemented by a microcomputer. For example, the X power failure detection means 231 to 23X may be stored in the internal memory of the microcomputer as programs, a program selected by the selection means 24 may be executed, and it may be detected in accordance with the interconnection signal 241 whether a power failure state has been set. Not only the passive scheme implementation means 23' but also all of the selection means 24 and control means 26 may be implemented by one microcomputer.

First Embodiment

The first embodiment of the solar power generation system having the above arrangement will be described next with reference to the accompanying drawings.

Figure 3:
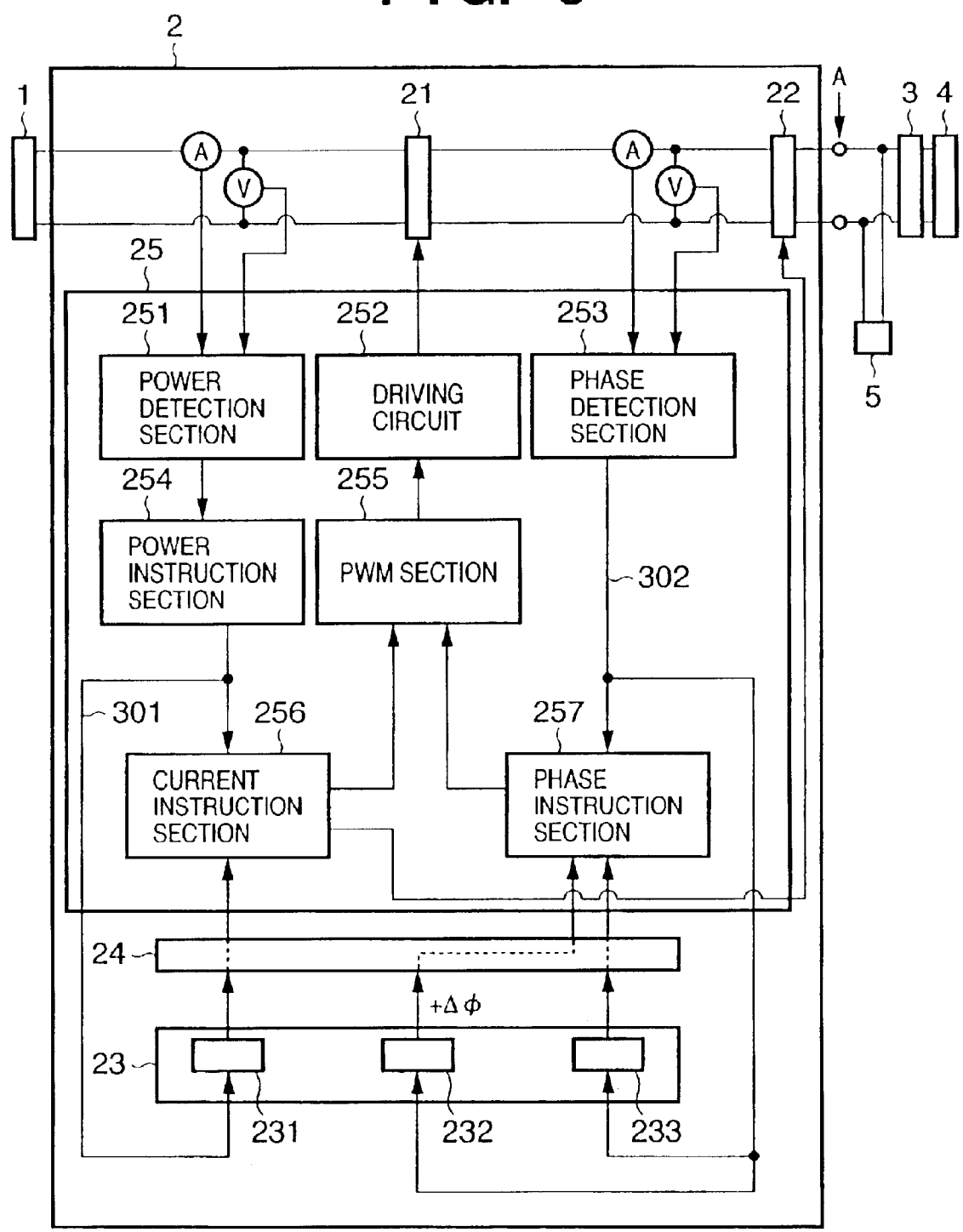
FIG. 3 is a block diagram showing the arrangement of a solar power generation system according to the first embodiment.

FIG. 3 is a block diagram showing the arrangement of a solar power generation system according to this embodiment. In an inverter 2 of this embodiment, an active scheme implementation means 23 has three implementation means 231 to 233 and can implement three active schemes. That is, the islanding operation detection means of the inverter has three different active schemes. In this embodiment, two inverters 2 with such an arrangement are interconnected to a single system 4, and multiple inverter parallel operation is executed. The outputs from the inverters are connected in parallel to each other at a connection point A. Solar batteries 1 and the inverters 2 are connected in a one-to-one correspondence.

Referring to FIG. 3, a control means 25 is a functional block which drives a power conversion means 21. A power detection section 251 calculates the input power value from the output of the solar battery 1 and outputs the power value to a power instruction section 254. The power instruction section 254 calculates a power instruction value 301 from the received input power value and outputs the power instruction value to a current instruction section 256. The current instruction section 256 calculates the current instruction value of the inverter 2 from the received power instruction value 301 and outputs the current instruction value to a PWM section 255. On the other hand, a phase detection section 253 calculates a phase signal 302 as the phase difference between the output voltage and the output current and outputs the phase signal to a phase instruction section 257. The phase instruction section 257 outputs a current phase instruction value for realizing a power factor of 1 from the received phase signal 302 to the PWM section 255. The PWM section 255 outputs a PWM signal for outputting a desired output current at a power factor of 1 from the received current instruction value and current phase instruction value to a driving circuit 252. The driving circuit 252 generates a driving signal from the received PWM signal, thereby driving the switching element of the inverter section of the power conversion means 21.

The active scheme implementation means 23 shown in FIG. 3 has the three implementation means 231 to 233. The first implementation means 231 is a means for implementing an active power variation scheme of active scheme and receives the power instruction value 301. The implementation means 231 outputs to the current instruction section 256 the power instruction value 301 (to be referred to as a fluctuation instruction value hereinafter) which superposes a fluctuation component having a predetermined period on the output current. The current instruction section 256 receives the fluctuation instruction value with a priority over the power instruction value, generates a current instruction value, and outputs it to the PWM section 255. Accordingly, the output current of the inverter 2 obtains a variation having a predetermined period with respect to the output voltage. Hence, the active power variation scheme is implemented.

The second implementation means 232 is a means for implementing a reactive power variation scheme of active scheme and receives the phase signal 302. The second implementation means 232 outputs a signal (to be referred to as a phase shift signal hereinafter) obtained by adding a phase difference $\Delta\phi$ to the phase signal at a predetermined period to the phase instruction section 257. The phase instruction section 257 receives the phase shift signal with a priority over the phase signal, generates a current phase instruction value, and outputs it to the PWM section 255. Accordingly, the output current of the inverter 2 obtains the predetermined phase difference $\Delta\phi$ every predetermined period. Hence, the reactive power variation scheme is implemented.

The third implementation means 233 is a means for implementing a frequency shift scheme of active scheme and receives the phase signal 302. The third implementation means 233 receives the frequency of an output detected by a frequency detection section (not shown). When the frequency rises beyond the rated frequency, the phase shift signal is set to an advanced phase. Conversely, when the frequency decreases, the phase shift signal is set to a delayed phase. The phase shift signal is output to the phase instruction section 257. Processing from this point is executed as in the second implementation means 232. When the output frequency of the inverter 2 rises beyond the rated frequency, the output frequency of the inverter further rises. Conversely, when the output frequency decreases to less than the rated frequency, the output frequency of the inverter further decreases. Accordingly, the reactive power variation scheme is implemented.

The selection means 24 is a means implemented on software. This software is operated by manual operation on the setting panel (not shown) of the inverter 2. The schemes (implementation means) are set on the respective inverters so as not to select the same implementation means in the two inverters used in this embodiment.

In this embodiment, as the solar battery 1, an a-Si solar battery module for outputting 120 W under standard sunlight (sunlight intensity is 1 kW/m$^2$) is used. As a circuit breaker 3, a mechanical switch is used. The system 4 is a single-phase two-wire commercial power system with a frequency of 60 Hz. The electrical scheme of the output of the inverter 2 is also the same as that of the system 4. The rated output is 100 W. As a load 5, a resistance load device and a grinder serving as a rotor load are used. As the switching element of the control means 25, a MOSFET is used. However, the switching element can have any type or form.

Verification experiments of the operation of the inverters of this embodiment will be described below.

To verify the operation of this embodiment, a comparative example including inverters in the same number and having the same system configuration as described above was used. The arrangement of the comparative example is the same as that shown in FIG. 5 described in association with the prior art above. The arrangement of the control means 25 of an inverter 10 is the same as that of the control means 25 of the inverter 2. The implementation means 231 receives a current instruction value and outputs a fluctuation instruction value to the current instruction section 256, as in the inverter 2. In addition, the operation and effect of the active scheme by the implementation means 231 are also the same as those of the inverter 2.

First, the solar batteries 1 were irradiated with sunlight such that the output powers of the two inverters 2 of the present invention almost equaled the rated output. Next, the power consumption of the pseudo load was adjusted to almost nullify the current passing through the circuit breaker 3. The circuit breaker 3 was opened while keeping this state. In the two inverters 2, the system protection functions (an increase in abnormal voltage, a decrease in abnormal voltage, an increase in abnormal frequency, and a decrease in abnormal frequency) acted about 1 sec after the breaker 3 was opened, and the control means 25 output a removal signal to the removal means 22. The inverters 2 were removed and stopped operation.

The same experiment was conducted using the inverter 10 of the comparative example. As a result, the active schemes of the two inverters were canceled each other, and both the two inverters continued operation.

As described above, according to this embodiment, one inverter has an islanding operation detection means having a plurality of kinds of active schemes for islanding operation detection, and one or more active schemes can be selected and applied. For these reasons, even when parallel operation of a plurality of inverters is to be executed, no master-slave cables are necessary, and an inexpensive system having a good installation operability and high degree of freedom in installation can be implemented. In addition, in multiple inverter parallel operation, islanding operation can be sufficiently detected by inverters of single model. No inverters of a plurality of models need be prepared. Furthermore, the effect in mass production of inverters of the same model is also large. Hence, a more inexpensive inverter can be implemented.

Any other combination of active schemes other than those selected in the inverters 2 of this embodiment can be used without any problem. That is, in multiple inverter parallel operation, it is only necessary that a larger number of types of active schemes can be applied to compensate for the dead zones of the respective active schemes and to prevent any unbalanced operation between the active schemes. In addition, the selection means 24 can be implemented by either software or hardware, and its arrangement is not limited. That is, it is only necessary that one or more schemes can be selected from a plurality of kinds of active schemes, and the selected schemes can be applied as active schemes. Furthermore, the inverter is stopped upon detecting a disturbance in the system in the power failure state, which is given by an active scheme having no passive scheme in the islanding operation detection means of the system interconnection inverter, by various system protection functions (system abnormality detection functions) described above, as in this embodiment. However, the target for selection of an implementation means for detecting islanding operation is the plurality of active schemes.

Second Embodiment

The second embodiment of the solar power generation system according to the present invention will be described below. A description of the same parts as in the first embodiment will be omitted. The characteristic part of this embodiment will mainly be described.

In the arrangement of this embodiment, seven inverters 2 of the first embodiment are used. Each of the seven inverters 2 has the same arrangement as that described in the first embodiment. These inverters are interconnected to a single system 4, and multiple inverter parallel operation is executed. The comparative example also has inverters in the same number and the same system configuration as described above.

In addition, to make the inverters 2 select a well-balanced combination of active schemes as much as possible, setting is done such that, of the seven inverters, three inverters select implementation means 231, two inverters select implementation means 232, and two inverters select implementation means 233 using selection means 24.

Verification experiments of the operation of the inverters of this embodiment will be described below.

Verification experiments were conducted using this embodiment having seven inverters 2 and a comparative example having seven inverters 10 under the same conditions as in the first embodiment. As a result, in this embodiment, the inverters 2 stopped operation, as in the first embodiment. In addition, since a total of three kinds of active schemes were used by adding a kind of active scheme, and the number of inverters operated increased, the duration of islanding operation decreased even in the islanding operation range in the first embodiment. On the other hand, the inverters 10 of the comparative example continued islanding operation, as in the first embodiment.

As described above, according to this embodiment, one inverter has a plurality of kinds of active schemes for islanding operation detection, and one or more active schemes can be selected and applied. For these reasons, even when parallel operation of a plurality of inverters is to be executed, no master-slave cables are necessary, and an inexpensive system having a good installation operability and high degree of freedom in installation can be implemented. In addition, in multiple inverter parallel operation, islanding operation can be sufficiently detected by inverters of single model. No inverters of a plurality of models need be prepared. Furthermore, the effect in mass production of inverters of the same model is also large. Hence, a more inexpensive inverter can be implemented.

Third Embodiment

The third embodiment of the solar power generation system according to the present invention will be described below. A description of the same parts as in the first embodiment will be omitted. The characteristic part of this embodiment will mainly be described.

Figure 4:
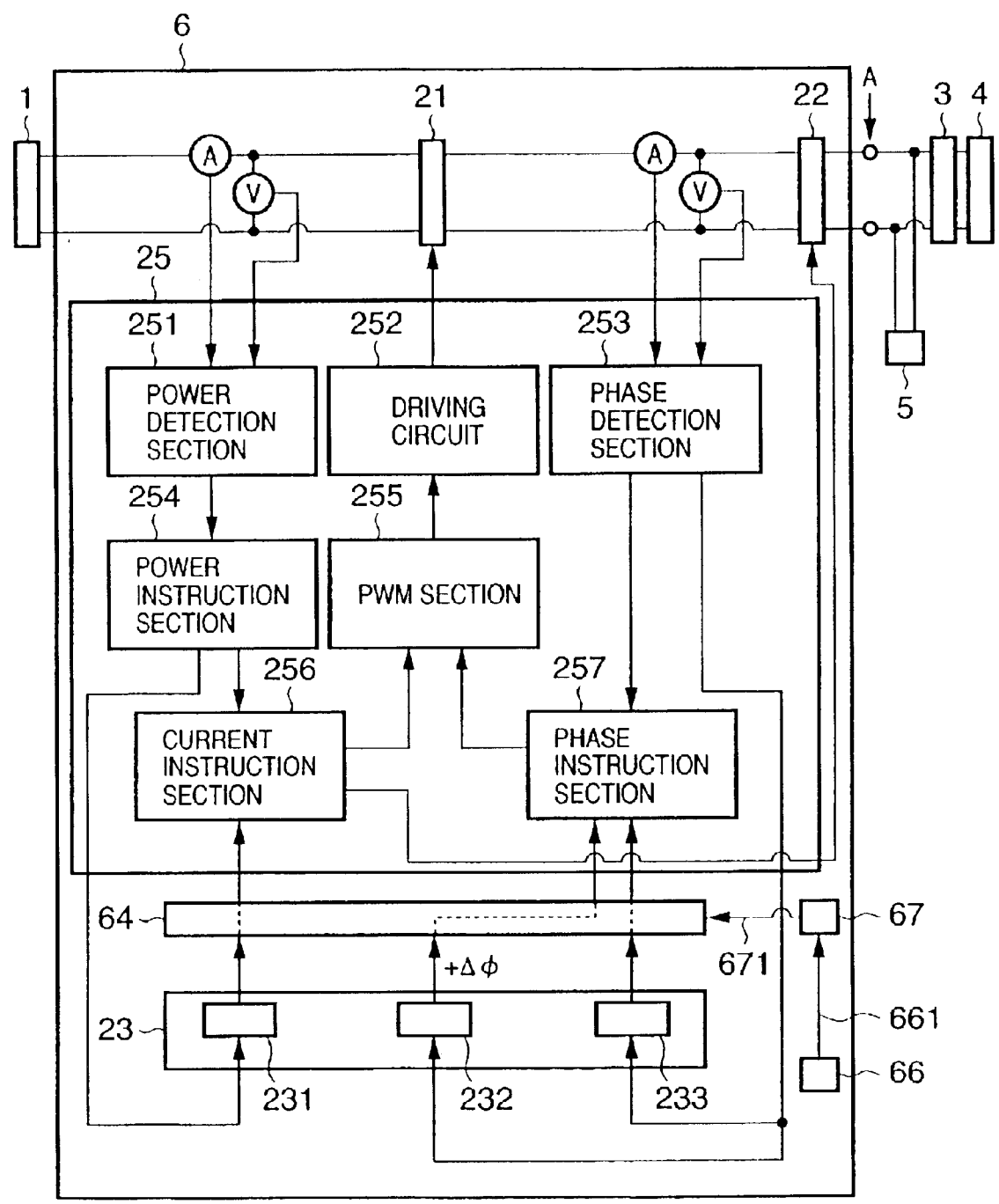
FIG. 4 is a block diagram showing the arrangement of a solar power generation system according to the third embodiment.

FIG. 4 is a block diagram showing the arrangement of this embodiment. The third embodiment is different from the first embodiment in that a system interconnection inverter apparatus 6 (to be referred to as an inverter 6 hereinafter) has a time setting means 66 and random selection means 67 and that the apparatus has a selection means 64 in place of the selection means 24.

In this embodiment, 10 inverters 6 are interconnected to a single system 4, and multiple inverter parallel operation is executed. Solar batteries 1 and the inverters 2 are connected in a one-to-one correspondence. The comparative example also has inverters in the same number and the same system configuration as described above.

FIG. 4 is a block diagram showing the arrangement of the solar power generation system according to this embodiment. The time setting means 66 outputs a start signal 661 which makes the random selection means 67 (to be described later) start random selection. In this embodiment, setting is done such that the start signal 661 is output at the first activation of the inverters in a day.

The random selection means 67 is a means for selecting, at random, implementation means 231 to 233 to be selected by the selection means 64, and starts random selection upon receiving the start signal 661 from the time setting means 66. The result (to be referred to as a selection result signal 671 hereinafter) is output to the selection means 64. Upon receiving the selection result signal 671, the selection means 64 selects an implementation means in accordance with the result signal.

With the above operation, the active schemes of the inverters 6 are selected at random at the first activation of a day, and the selected schemes are set as the islanding operation detection scheme. The random selection method is not limited to the above method. For example, random selection may be started at every inverter activation time. Alternatively, random selection may be performed at random time. Random selection may be executed even at the time of installation of the inverters. That is, it is only necessary to select a well-balanced combination of active schemes.

Verification experiments of the operation of the inverters of this embodiment will be described below.

The inverters 6 were connected in the arrangement shown in FIG. 4 at 11:00 pm when the output of the solar battery was normally zero in Japan. At about 7:00 am in the next morning when the sun rose, and the output of the solar battery 1 satisfied the activation condition, the inverters 6 were activated. The inverters 6 started outputting an AC current several minutes after their activation, and random selection was simultaneously executed. As a result, 3 implementation means 231, 4 implementation means 232, and 3 implementation means 233 were automatically set.

As described above, according to this embodiment, one inverter has an islanding operation detection means having a plurality of kinds of active schemes for islanding operation detection, and one or more active schemes can be selected and applied. For these reasons, even when parallel operation of a plurality of inverters is to be executed, no master-slave cables are necessary, and an inexpensive system having a good installation operability and high degree of freedom in installation can be implemented. In addition, in multiple inverter parallel operation, islanding operation can be sufficiently detected by inverters of single model. No inverters of a plurality of models need be prepared. Furthermore, the effect in mass production of inverters of the same model is also large. Hence, a more inexpensive inverter can be implemented.

In addition, in this embodiment, since the active schemes are automatically selected and set at random, the labor in setting the active schemes can be greatly decreased. This effect becomes very conspicuous as the number of inverters increases.

Fourth Embodiment

The fourth embodiment of the solar power generation system according to the present invention will be described below. A description of the same parts as in the first embodiment will be omitted. The characteristic part of this embodiment will mainly be described.

Figure 8:
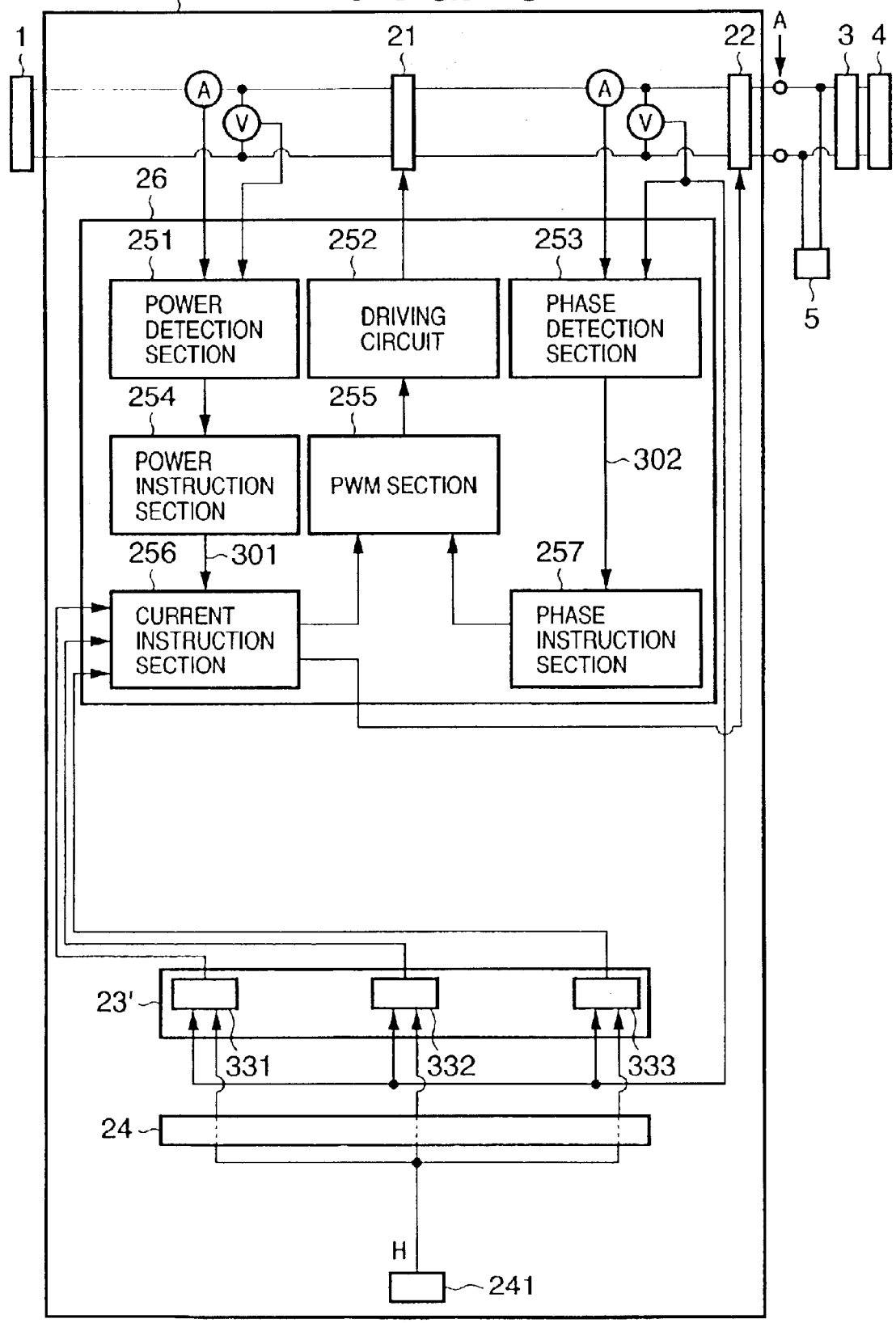
FIG. 8 is a block diagram showing the arrangement of a solar power generation system according to the fourth embodiment.

FIG. 8 is a block diagram showing the arrangement of a solar power generation system according to this embodiment. In this embodiment, five inverters 101 are interconnected to a single system 4, and multiple inverter parallel operation is executed. The outputs from the inverters are connected in parallel to each other at a connection point A. Solar batteries 1 and the inverters 101 are connected in a one-to-one correspondence, as in FIG. 2.

As a characteristic feature, the inverter 101 of this embodiment has a passive scheme implementation means 23' capable of implementing three passive schemes and a selection means 24, that is, the islanding operation detection means of the inverter has three different passive schemes. The inverter 101 of this embodiment will be described below mainly in association with these components.

A control means 26 shown in FIG. 8 is a functional block of a control means for driving a power conversion means 21. The control means 26 has a power detection section 251, power instruction section 254, current instruction section 256, phase detection section 253, phase instruction section 257, PWM section 255, and driving circuit 252, like the control means 26 shown in FIG. 3 in the first embodiment.

The passive scheme implementation means 23' shown in FIG. 8 has three power failure detection means 331 to 333. The first power failure detection means 331 implements, as a passive scheme, a voltage phase jump detection scheme which detects a jump in instantaneous phase of the output voltage of the inverter 101, which occurs at the time of a power failure, thereby determining a power failure in the system. The second power failure detection means 332 implements, as a passive scheme, a third harmonic voltage distortion abrupt increase detection scheme which detects an abrupt increase in third harmonic distortion of the output voltage of the inverter 101, which occurs at the time of a power failure, thereby determining a power failure in the system. The third power failure detection means 333 implements, as a passive scheme, a frequency change rate detection scheme which detects an abrupt change in frequency of the output voltage of the inverter 101, which occurs at the time of a power failure, thereby determining a power failure in the system.

The selection means 24 receives an interconnection signal 241 from the control means 26, selects one of the three power failure detection means, and outputs the interconnection signal 241. Upon receiving the interconnection signal and determining a power failure in the system from the output voltage, the power failure detection means selected by the selection means 24 outputs a stop signal H (Hi) to the current instruction section 256 arranged in the control means 26. The outputs from the unselected power failure detection means are fixed at L (Low).

The passive scheme implementation means 23' and selection means 24 are means implemented on software. This software is operated by manual operation on the setting panel (not shown) of the inverter 101. Setting is done such that of the five inverters used in this embodiment, two inverters select the power failure detection means 331, and three inverters select the power failure detection means 332. The program of the power failure detection means unselected in each inverter is not executed.

In this embodiment, the solar battery 1, circuit breaker 3, system 4, and load 5 are the same as in the first embodiment. The electrical scheme of the output of the inverter 101 is also the same as that of the system 3. The rated output is 100 W. As the switching element, of the control means 25, a MOSFET is used. However, the switching element can have any type or form.

Verification experiments of the operation of the inverters of this embodiment will be described below.

To verify the operation of this embodiment, a comparative example including inverters in the same number and having the same system configuration as described above was used. The arrangement of the comparative example is the same as that shown in FIG. 12. The arrangement of the control means 26 of the inverter 8 is the same as that of the control means 26 of the inverter 101. The operation and effect of the passive scheme by the power failure detection means 331 are also the same as those of the inverter 101.

First, the solar batteries 1 were irradiated with sunlight such that the output powers of the five inverters 101 of the present invention almost equaled the rated output. Next, the power consumption of the load 5 was adjusted such that, for the current flowing from the system 4 to the load 5, the effective current became 0.04 A, and the power factor becomes about −0.5. The circuit breaker 3 was opened while keeping this state. In the five inverters 101, the power failure detection means 331 or 332 detected a power failure in the system about 0.5 sec after the breaker 3 was opened. A stop signal was output, and the five inverters 101 stopped operation.

The same experiment was conducted using the inverter 8 of the comparative example. As a result, since the five inverters had the same passive scheme and the same dead band, all the five inverters continued operation.

As described above, according to this embodiment, one inverter has an islanding operation detection means having a plurality of kinds of passive schemes for islanding operation detection, and one or more passive schemes can be selected and applied. For these reasons, even when parallel operation of a plurality of inverters is to be executed, islanding operation can be sufficiently detected by inverters of single model. Hence, no inverters of a plurality of models need be prepared. Furthermore, the effect in mass production of inverters of the same model is also large. Hence, a more inexpensive inverter can be implemented.

Any other combination of passive schemes other than those selected in the inverters 101 of this embodiment can be used without any problem. That is, in multiple inverter parallel operation, it is only necessary that a larger number of types of passive schemes can be applied to compensate for the dead areas of the respective passive schemes and to prevent any unbalanced operation between the passive schemes. In addition, the selection means 24 can be implemented by either software or hardware, and its arrangement is not limited. That is, it is only necessary that one passive scheme can be selected from a plurality of passive schemes of islanding operation detection function.

The inverter of this embodiment is effective when a plurality of inverters are system-interconnected in the same region. For example, when the inverters of this embodiment are system-interconnected in the same region, occurrence of islanding operation can be effectively suppressed. In addition, even when the conventional inverters and the inverters of this embodiment are system-interconnected, occurrence of islanding operation can be effectively suppressed by selecting the passive scheme of the inverter of this embodiment such that the dead zone of the passive scheme of the conventional inverter is compensated for.

Fifth Embodiment

The fifth embodiment of the solar power generation system according to the present invention will be described below. A description of the same parts as in the above embodiments will be omitted. The characteristic part of this embodiment will mainly be described.

Figure 9:
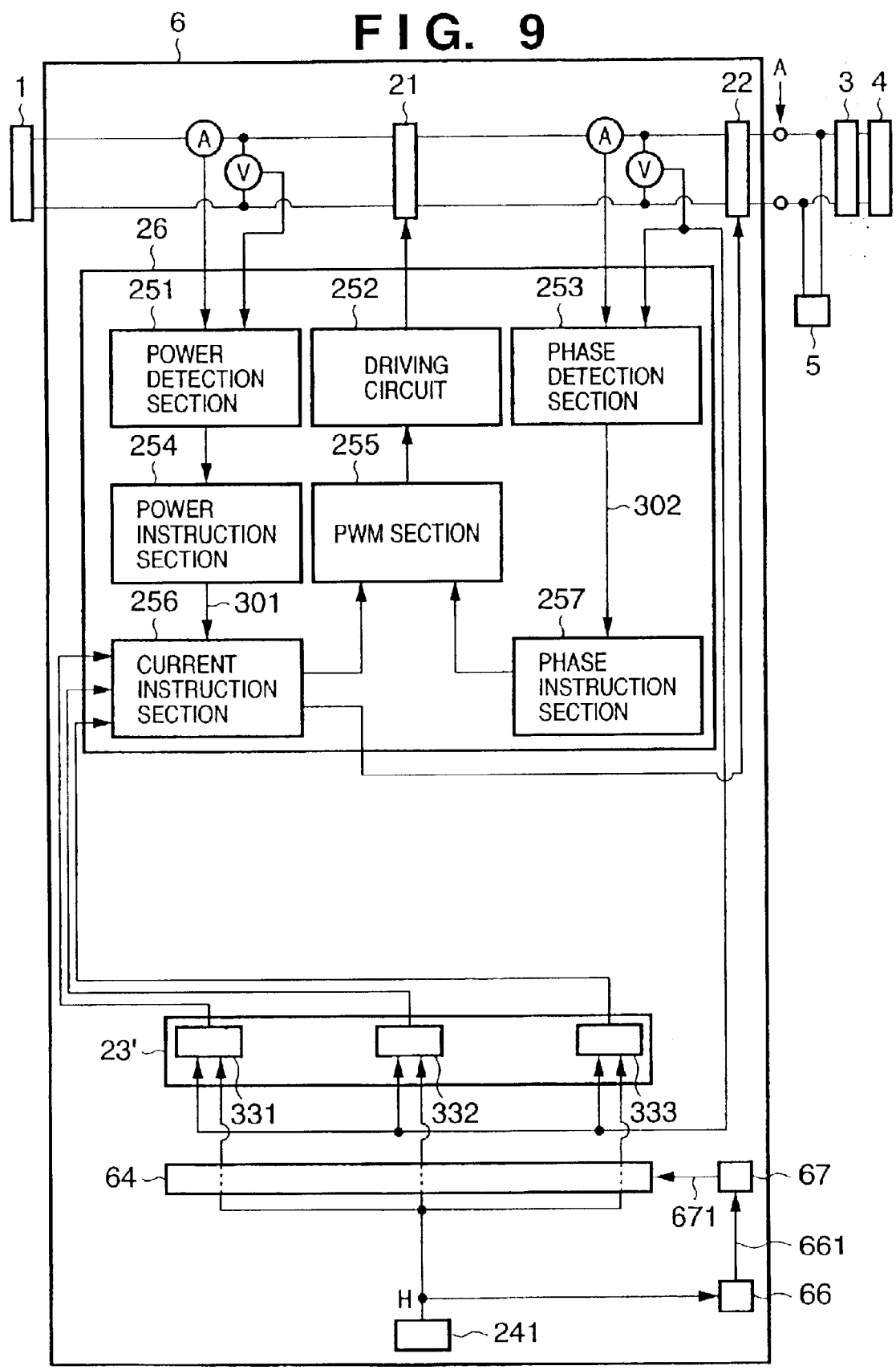
FIG. 9 is a block diagram showing the arrangement of a solar power generation system according to the fifth embodiment.

FIG. 9 is a block diagram showing the arrangement of a solar power generation system according to this embodiment. In this embodiment, 10 inverters 6 are interconnected to a single system 4, and multiple inverter parallel operation is executed. Solar batteries 1 and the inverters 6 are connected in a one-to-one correspondence.

A system interconnection inverter apparatus 6 (to be referred to as an inverter 6 hereinafter) of this embodiment is different from the inverter 101 of the fourth embodiment in that the inverter 6 has a time setting means 66 and random selection means 67 and that the inverter has a selection means 64 in place of the system 4. This embodiment will be described below mainly in association with these parts different from the fourth embodiment.

The time setting means 66 outputs a first start signal 661 which makes the random selection means 67 (to be described later) start random selection. The time setting means 66 also receives an interconnection signal 241. In this embodiment, setting is done such that the first start signal 661 is output at the first activation of the inverters in a day, i.e., when the interconnection signal is input to the time setting means 66 at the start of the day.

The random selection means 67 is a means for selecting, at random, one of power failure detection means 331 to 333 to be selected by the selection means 64, and starts random selection upon receiving the first start signal 661. The result (to be referred to as a first selection result signal 671 hereinafter) is output to the selection means 64. Upon receiving the first selection result signal 671, the selection means 64 selects one of the power failure detection means 331 to 333 in accordance with the result signal.

With the above operation, the passive schemes of the inverters 6 are selected at random at the first activation of a day, and the selected schemes are set as the islanding operation detection scheme. The random selection method is not limited to the above method. For example, random selection may be started at every inverter activation time. Alternatively, the start timing may be set at random. Random selection may be executed even at the time of installation of the inverters. That is, it is only necessary to prevent an unbalanced operation of the passive schemes in the plurality of inverters.

Verification experiments of the inverters of this embodiment will be described below.

The inverters 6 shown in FIG. 9 were connected to an experiment circuit at 11:00 pm when the output of the solar battery was normally zero in Japan. At about 7:00 am in the next morning when the sun rose, and the output of the solar battery 1 satisfied the activation condition, the inverter 6 were activated. The inverters 6 started outputting a current several minute after. After the start of interconnection, random selection was simultaneously executed. As a result, three power failure detection means 331, four power failure detection means 332, and three power failure detection means 333 were automatically set.

In addition, verification experiments were conducted under the same conditions as in the fourth embodiment using the inverters 6 of this embodiment and the inverters 8 of a comparative example which implemented only the same passive scheme with the same arrangement. As a result, the inverters 6 of this embodiment stopped operation, as in the fourth embodiment. In addition, since the number of inverters operated increased, the duration of islanding operation decreased even in the islanding operation range in the fourth embodiment. On the other hand, the inverters 8 of the comparative example continued islanding operation, as in the fourth embodiment.

As described above, according to this embodiment, one inverter has an islanding operation detection means having a plurality of kinds of passive schemes of islanding operation detection functions, and one or more passive schemes can be selected and applied. For these reasons, even when parallel operation of a plurality of inverters is to be executed, islanding operation can be sufficiently detected by inverters of single model. Hence, no inverters of a plurality of models need be prepared. Furthermore, the effect in mass production of inverters of the same model is also large. Hence, a more inexpensive inverter can be implemented.

In addition, in this embodiment, since the passive schemes are automatically selected and set at random, the labor in setting the passive schemes can be greatly decreased. This effect becomes very conspicuous as the number of inverters increases. In addition, if a system interconnection system which requires no prior application to electric power companies becomes popular, and for example, if a system such as an AC module to be inserted into a wall socket greatly penetrates, it is difficult to grasp the islanding operation detection schemes of the system interconnection systems in neighboring homes. In this case, the effect of the present invention in which the islanding operation detection schemes are selected at random, as described above, is especially large.

Sixth Embodiment

The sixth embodiment of the solar power generation system according to the present invention will be described below. A description of the same parts as in the above embodiments will be omitted. The characteristic part of this embodiment will mainly be described.

As a characteristic feature of this embodiment, active schemes and passive schemes are combined and executed as an islanding operation detection function. That is, the islanding operation detection means of an inverter includes both active schemes and passive schemes. The operations and selection of passive schemes are the same as in the third or fifth embodiment, and a description thereof will be omitted here.

A system interconnection inverter apparatus (to be referred to as an inverter 7 hereinafter) of this embodiment is different from the inverter 6 of the fifth embodiment in that the inverter has an active scheme implementation means 73, selection means 74, time setting means 76, and random selection means 77 and that inverter has a control means 75 in place of the control means 26. This embodiment will be described below mainly in association with these parts different from the fifth embodiment.

Figure 10:
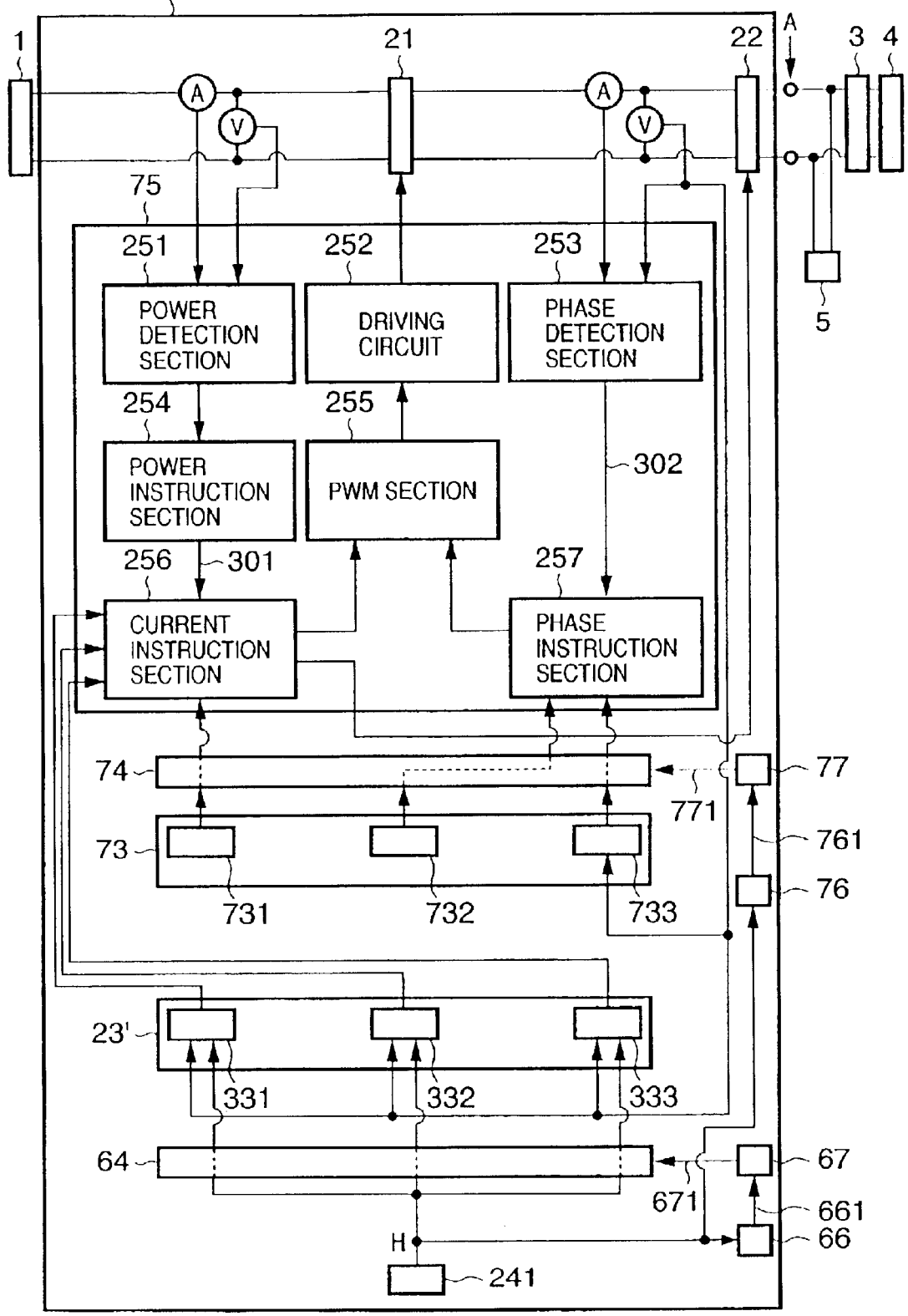
FIG. 10 is a block diagram showing the arrangement of a solar power generation system according to the sixth embodiment.

FIG. 10 is a block diagram showing the arrangement of a solar power generation system according to this embodiment. In this embodiment, 10 inverters 6 are interconnected to a single system 4, and multiple inverter parallel operation is executed. Solar batteries 1 and the inverters 2 are connected in a one-to-one correspondence.

The active scheme implementation means 73 shown in FIG. 10 has three variation generation means 731 to 733.

The first variation generation means 731 is a means for implementing the active power variation scheme of active scheme and has the same arrangement as that of the variation generation means 231 of the first embodiment. The second variation generation means 732 is a means for implementing the reactive power variation scheme of active scheme and has the same arrangement as that of the variation generation means 232 of the first embodiment. The third variation generation means 733 is a means for implementing the frequency shift scheme of active scheme and has the same arrangement as that of the variation generation means 233 of the first embodiment.

The time setting means 76 basically has the same arrangement as the time setting means 66 of the fifth embodiment and outputs a second start signal 761 for starting random selection by the random selection means 77 (to be described later). The time setting means 76 also receives an interconnection signal 241. In this embodiment as well, setting is done such that the second start signal 761 is output at the first inverter interconnection time in a day, as in the fifth embodiment.

The random selection means 77 is a means for selecting, at random, one of the variation generation means 731 to 733 to be selected by the selection means 74, and starts random selection upon receiving the second start signal 761. The result (to be referred to as a second selection result signal 771 hereinafter) is output to the selection means 74. Upon receiving the second selection result signal 771, the selection means 74 selects a variation generation means in accordance with the result signal 771.

With the above operation, the active schemes of the inverters 6 are selected at random at the first activation of a day, and the selected schemes are set as the islanding operation detection scheme. The random selection method is not limited to the above method. For example, random selection may be started at every inverter activation time. Alternatively, the start timing may be set at random. Random selection may be executed even at the time of installation of the inverters. That is, it is only necessary to prevent an unbalanced operation of the active schemes in the plurality of inverters.

Verification experiments of the inverters of this embodiment will be described below.

As in the fifth embodiment, the inverters 7 were connected to an experiment circuit shown in FIG. 10 at 11:00 pm. At about 7:00 am in the next day, the inverters 7 were activated. The inverters 7 started outputting a current several minutes after their activation. After the start of interconnection, random selection was simultaneously executed. As a result, three power failure detection means 331, three power failure detection means 332, four power failure detection means 333, four variation generation means 731, three variation generation means 732, and three variation generation means 733 were automatically set.

Figure 11:
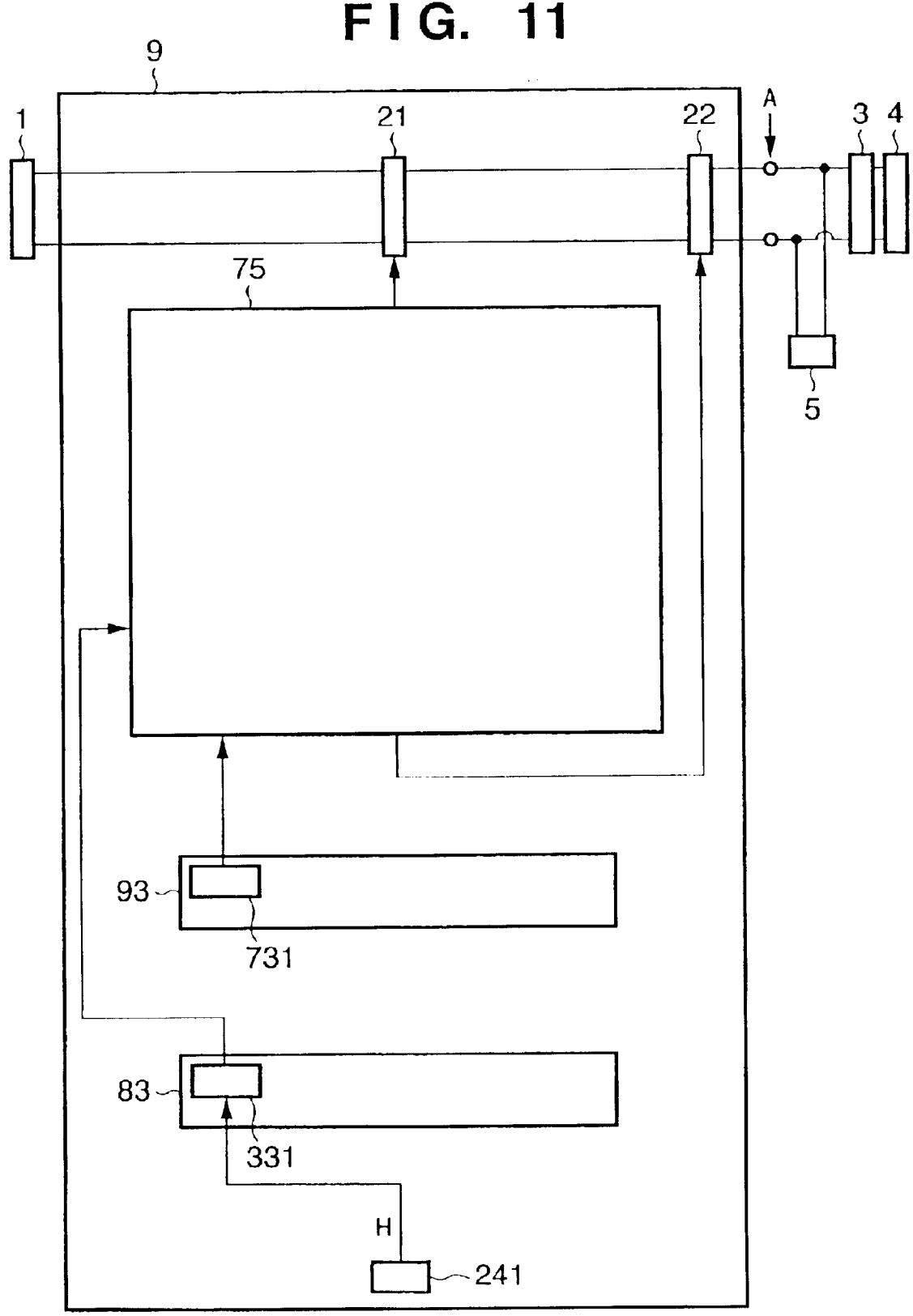
FIG. 11 is a block diagram showing the arrangement of a conventional solar power generation system as a comparative example of the sixth embodiment.

In addition, verification experiments were conducted under the same conditions as in the fifth embodiment using the inverters 7 of this embodiment and inverters 9 having an arrangement shown in FIG. 11 as a comparative example. The inverter 9 shown in FIG. 11 is different from the inverter 7 in that the inverter 9 has an active scheme implementation means 93 and passive scheme implementation means 83 in place of the active scheme implementation means 73 and passive scheme implementation means 23' and in that the inverter 9 has no selection means 74 and selection means 64, no time setting means 76 and time setting means 66, and no random selection means 77 and random selection means 67. The active scheme implementation means 93 and passive scheme implementation means 83 of the inverter 9 have only one variation generation means 731 and one power failure detection means 331, respectively. As a result, the inverters 7 of the present invention stopped operation, as in the fifth embodiment. In addition, since the active schemes were newly added, the duration of islanding operation in the islanding operation range in the fifth embodiment also decreased. On the other hand, since the active schemes were newly added also to the inverters 9 of the comparative examples, the islanding operation range became narrower than in the fifth embodiment. However, the inverter had only the passive scheme and active scheme of the same type. Hence, even in the range where the inverter 7 of this embodiment stopped, islanding operation sometimes continued.

As described above, according to this embodiment, each inverter has an islanding operation detection means having a plurality of kinds of passive schemes and active schemes of islanding operation detection functions, and one passive scheme and one active scheme can be selected and applied. For these reasons, even when parallel operation of a plurality of inverters is to be executed, the inverter of this embodiment can do sufficient islanding operation detection with a single model. Hence, no inverters of a plurality of models using different islanding operation detection schemes need be prepared. Furthermore, the effect in mass production of inverters of the same model is also large. Hence, a more inexpensive inverter can be implemented.

In addition, in this embodiment, since the passive schemes and active schemes are automatically selected and set at random, the labor in setting each scheme can be greatly decreased. This effect becomes very conspicuous as the number of inverters increases.

Other Embodiment

Even in a single passive scheme or passive scheme, the number of kinds of pseudo-passive schemes or pseudo-active schemes can be increased by changing a detection parameter such as a detection time, detection period, or detection width, or a variation parameter such as a variation time, variation period, or variation width. Additionally, like the random selection in the above embodiments, a means for selecting these parameters at random can also be preferably used.

In this way, when the number of kinds of pseudo-passive schemes or pseudo-active schemes is increased, and the schemes are selected at random, the islanding operation detection sensitivity further increases. Note that the parameters must be selected not to degrade the detection capability by interference between the active schemes. In addition, when the inverter according to the present invention is interconnected in a region where a number of conventional inverters are interconnected, it is almost impossible that the inverter of this embodiment selects the same scheme as that of the conventional inverters, and occurrence of islanding operation can be effectively suppressed. Hence, the effect obtained by the present invention can be said to be very large.

The same effect as described above can be obtained in each scheme without combining the passive schemes and active schemes.

The present invention can be applied to a system comprising a plurality of devices (e.g., host computer, interface, reader, printer) or to an apparatus comprising a single device (e.g. inverter).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer, the present invention also includes a case where an OS (operating system) or the like working on the computer performs parts or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As is apparent, many different embodiments of the present invention can be made without departing from the spirit and scope thereof, so it is to be understood that the invention is not limited to the specific embodiments thereof except as defined in the appended claims.

INDUSTRIAL APPLICABILITY

The present invention can be applied to a power conversion apparatus such as an inverter which converts a DC power into an AC power and outputs it to a system power supply, and a power conversion system having a plurality of power conversion apparatuses. In executing multiple inverter parallel operation using a plurality of power conversion apparatuses, a well-balanced combination of schemes for detecting islanding operation, which are to be operated in the respective power conversion apparatuses, is selected. Since no master-slave cables are necessary, the entire cost decreases, the operability in installation increases, and the degree of freedom in installation increases. In addition, in multiple inverter parallel operation, no power conversion apparatuses for detecting islanding operation in accordance with different active schemes or passive schemes need be prepared. Furthermore, in mass production of power conversion apparatuses of the same model, a more inexpensive power conversion apparatus can be implemented.

What is claimed is:

1. A power conversion apparatus for converting a DC power into an AC power and outputting the AC power to a system power supply, characterized by comprising:

islanding operation detection means having a plurality of different schemes which detect an islanding operation state in which power supply from the system power supply is stopped; and selection means for selecting at least one scheme to be operated from the plurality of schemes.

2. The power conversion apparatus according to claim 1, characterized in that the plurality of schemes are active schemes.

3. The power conversion apparatus according to claim 2, characterized in that the plurality of schemes include at least one of an active power variation scheme, a reactive power variation scheme, and a frequency shift scheme.

4. The power conversion apparatus according to claim 1, characterized in that the plurality of schemes are passive schemes.

5. The power conversion apparatus according to claim 4, characterized in that the plurality of schemes include at least one of an voltage phase jump detection scheme, a third harmonic voltage distortion abrupt increase detection scheme, and a frequency change rate detection scheme.

6. The power conversion apparatus according to claim 1, characterized in that the plurality of schemes include an active scheme and a passive scheme.

7. The power conversion apparatus according to claim 1, characterized in that said selection means selects at least one scheme in accordance with a user input.

8. The power conversion apparatus according to claim 1, characterized in that said selection means selects at least one scheme at random.

9. The power conversion apparatus according to claim 8, characterized in that said selection means selects the plurality of schemes at substantially the same probability.

10. The power conversion apparatus according to claim 8, characterized by further comprising time setting means for determining a timing of selection by said selection means.

11. The power conversion apparatus according to claim 10, characterized in that said time setting means makes said selection means perform selection when the power conversion apparatus is activated.

12. The power conversion apparatus according to claim 10, characterized in that said time setting means makes said selection means perform selection at predetermined time.

13. The power conversion apparatus according to claim 1, characterized in that the DC power is supplied from a DC power supply.

14. The power conversion apparatus according to claim 13, characterized in that the DC power supply is a solar battery.

15. A power conversion system comprising a plurality of sets of the power conversion apparatuses of claim 1 and DC power supplies which are arranged in correspondence with the power conversion apparatuses and supply the DC power, characterized in that schemes in substantially equal number are selected in the system.

16. The power conversion system according to claim 15, characterized in that the DC power supply is a solar battery.

17. An islanding operation detection method for a power conversion apparatus for converting a DC power into an AC power and outputting the AC power to a system power supply, characterized by comprising:

arranging islanding operation detection means having a plurality of different schemes which detect an islanding operation state in which power supply from the system power supply is stopped; and selecting at least one scheme from the plurality of schemes and operating the scheme.

18. The islanding operation detection method according to claim 17, characterized in that the plurality of schemes are active schemes.

19. The islanding operation detection method according to claim 18, characterized in that the plurality of schemes include at least one of an active power variation scheme, a reactive power variation scheme, and a frequency shift scheme.

20. The islanding operation detection method according to claim 17, characterized in that the plurality of schemes are passive schemes.

21. The islanding operation detection method according to claim 20, characterized in that the plurality of schemes include at least one of an voltage phase jump detection scheme, a third harmonic voltage distortion abrupt increase detection scheme, and a frequency change rate detection scheme.

22. The islanding operation detection method according to claim 17, characterized in that the plurality of schemes include an active scheme and a passive scheme.

23. An islanding operation detection method for a power conversion system comprising a plurality of sets of power conversion apparatuses for converting a DC power into an AC power and outputting the AC power to a system power supply and DC power supplies which are arranged in correspondence with the power conversion apparatuses and supply the DC power, characterized by comprising arranging, in each power conversion apparatus, islanding operation detection means having a plurality of different schemes which detect an islanding operation state in which power supply from the system power supply is stopped; and selecting the schemes in each power conversion apparatus so as to select schemes in substantially equal number, which are to be operated in the system.

24. The islanding operation detection method according to claim 23, characterized in that the plurality of schemes are active schemes.

25. The islanding operation detection method according to claim 24, characterized in that the plurality of schemes include at least one of an active power variation scheme, a reactive power variation scheme, and a frequency shift scheme.

26. The islanding operation detection method according to claim 23, characterized in that the plurality of schemes are passive schemes.

27. The islanding operation detection method according to claim 26, characterized in that the plurality of schemes include at least one of an voltage phase jump detection scheme, a third harmonic voltage distortion abrupt increase detection scheme, and a frequency change rate detection scheme.

28. The islanding operation detection method according to claim 23, characterized in that the plurality of schemes include an active scheme and a passive scheme.

* * * * *

UNITED STATES PATENT AND TRADEMARK OFFICE
CERTIFICATE OF CORRECTION

PATENT NO. : 6,801,442 B2
DATED : October 5, 2004
INVENTOR(S) : Masaki Suzui et al.

It is certified that error appears in the above-identified patent and that said Letters Patent is hereby corrected as shown below:

<u>Title page,</u>
Item [56], References Cited, FOREIGN PATENT DOCUMENTS, "7245876" should read -- 7-245876 --; "8070534" should read -- 8-70534 --; "9084251" should read -- 9-84251 --; "9098539" should read -- 9-98539 --; "10336903" should read -- 10-336903 --; "2000152506" should read -- 2000-152506 --; and "2001169565" should read -- 2001-169565 --.

<u>Column 5,</u>
Line 9, "view' showing" should read -- view showing --.

<u>Column 15,</u>
Line 13, "inverter" should read -- inverters --.

<u>Column 20,</u>
Lines 16, 24, 30, 51 and 64, "include" should read -- includes --;
Lines 24 and 51, "an" should read -- a --; and
Line 37, "comprising" should read -- comprising: --.

Signed and Sealed this

Twenty-eighth Day of February, 2006

JON W. DUDAS
*Director of the United States Patent and Trademark Office*